April 25, 1961 L. W. BOOTH 2,980,995
PRUNER
Filed Oct. 13, 1959
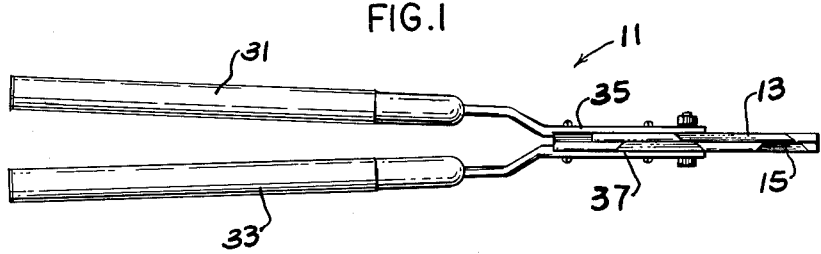
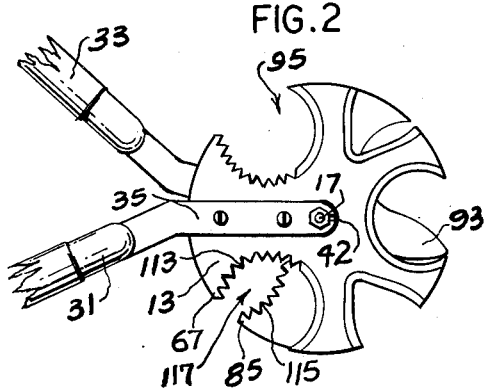
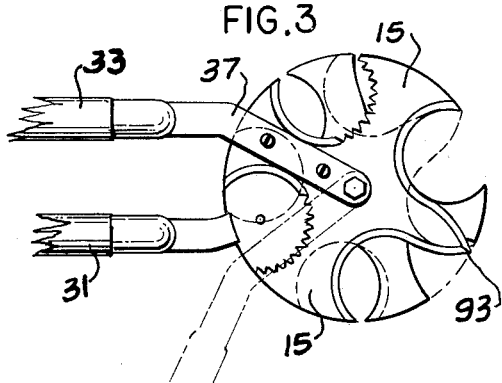
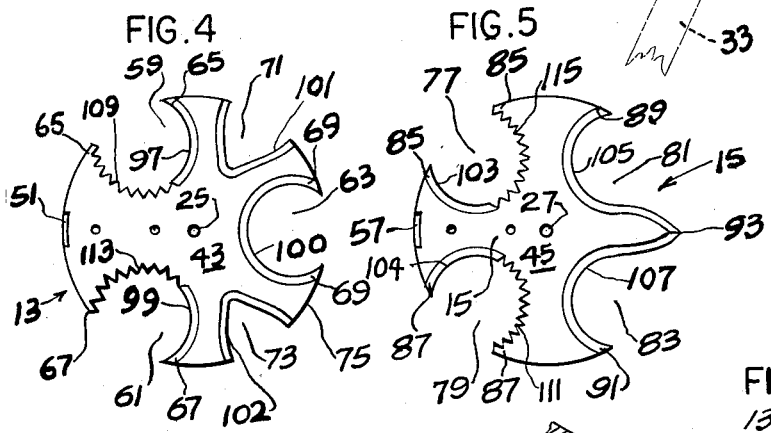
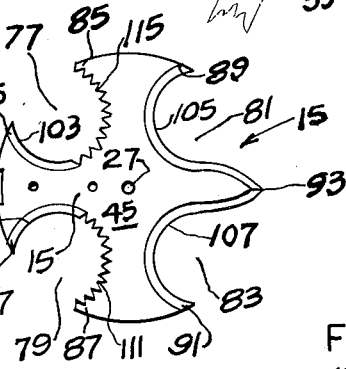
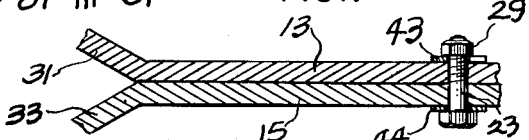
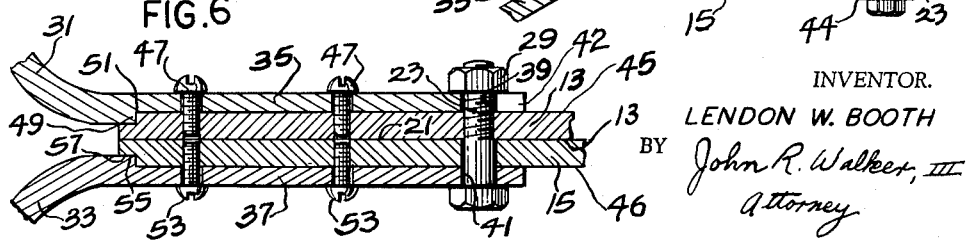
INVENTOR.
LENDON W. BOOTH
BY John R. Walker, III
Attorney

United States Patent Office 2,980,995
Patented Apr. 25, 1961

2,980,995
PRUNER
Lendon W. Booth, 943 Semmes, Memphis, Tenn.
Filed Oct. 13, 1959, Ser. No. 846,093
6 Claims. (Cl. 30—144)

This invention relates to a pruner for cutting shrubs, tree limbs, grass or the like.

In the well-known type of pruner that operates similarly to a pair of scissors in which the handles are first moved apart to receive the branches or the like between the blades of the pruner and then the handles are moved together to urge the blades into cutting relationship with the branches, there is wasted motion since there is no cutting performed on the back or opening stroke. In addition, this type of pruner has the disadvantage of not being able to cut large limbs.

The present invention is directed towards overcoming the disadvantages of pruners of the above-mentioned type and is directed towards generally improving the same.

Thus, one of the principal objects of the present invention is to provide a pruner which cuts both on the forward and back strokes so that there is no wasted motion.

A further object is to provide such a pruner in which there are no positive stops, but the handles of which are adapted to be swung as far as desired by the operator in both directions.

A further object is to provide such a pruner which is adapted to cut branches or the like when the pruner, as a whole, is moved in any direction and without any special attention on the operator's part.

A further object is to provide a pruner adapted to cut large limbs, as well as small branches, grass or the like.

A further object is to provide a convenient and handy device that is economical to manufacture and highly efficient in operation.

A further object is, generally, to improve the design and construction of pruners.

The means by which the foregoing and other objects of the present invention are accomplished and the manner of their accomplishment will be readily understood from the following specification upon reference to the accompanying drawings, in which:

Fig. 1 is a side elevational view of the pruner of the present invention.

Fig. 2 is a fragmentary top plan view thereof with the pruner being shown in one position of operation.

Fig. 3 is a fragmentary bottom view thereof with the pruner being shown in another position, and with a broken line representation of still another position.

Fig. 4 is a plan view of one of the cutting plates, per se.

Fig. 5 is a plan view of the other cutting plate.

Fig. 6 is an enlarged fragmentary sectional view taken as on a vertical plane through the longitudinal center line of the pruner with the handles in vertical alignment.

Fig. 7 is a view similar to Fig. 6 of an alternate embodiment and shown on a reduced scale.

Referring now to the drawings in which the various parts are indicated by numerals, pruner 11 includes, in general, a substantially circular plate 13, and a substantially circular plate 15 of substantially the same diameter as plate 13.

In assembled relationship plates 13, 15 are held together in flat face-to-face engagement for rotation about a common central axis, as at 17. In other words, the inner face 19 of plate 13 is in flat face-to-face sliding engagement with inner face 21 of plate 15. The plates are freely rotatable relative to one another for rotation in either direction for as far as desired. Thus, over 360 degree rotation is possible, although it is not normally done in the operation of the pruner.

The means for holding the plates together in the above-described disposition is preferably by a bolt 23 extending through central apertures 25, 27, respectively provided in plates 13, 15 with the bolt being anchored in place by means of a nut 29. Aperture 25 is preferably tapped so that bolt 23 is threadedly engaged therewith.

A pair of elongated handles 31, 33 are respectively fixedly attached to plates 13, 15, and respectively extend rearwardly therefrom. Handles 31, 33 are preferably removably fixedly attached to the plates or, if desired, the handles may be integrally fixedly attached to the plate as in the alternate embodiment shown in Fig. 7, without departing from the spirit and scope of the present invention.

In the preferred embodiment shown in Figs. 1–6, the handles are removably attached in the following manner. The forward ends of handles 31, 33 are respectively provided with end portions 35, 37, which, in turn, are respectively provided with apertures 39, 41 through which bolt 23 extends in the manner best shown in Fig. 6. End portion 35 is preferably split as at 42 from aperture 39 through the end of the end portion so that the end portion acts as a lock washer to lock the nut 29 in place. From the foregoing, it will be understood that bolt 23 is fixedly anchored relative to plate 13 for rotation therewith and that plate 15 rotates about bolt 23, which serves as an axle. In the alternate embodiment shown in Fig. 7, where there are no end portions, lock washer 43 is provided in place of end portion 35 and a conventional annular washer 44 is provided in place of end portion 37. During prolonged use of pruner 11, the inner faces 19 and 21 will wear slightly and the device may be easily adjusted by loosening nut 29 and turning bolt 23 in tapped aperture 25 so that the plates 13, 15 are drawn together. After bolt 23 is set at the proper place, nut 29 is tightened. This provides a self-sharpening feature of the pruner, as will be more fully understood in the hereinafter described operation of the device. End portions 35, 37 are respectively mounted on the outer faces 45, 46 of plates 13, 15, respectively. Screws 47 extend through apertures in end portion 35 and thence into tapped holes in plate 13 to hold the handle 31 in position. In addition, handle 31 is keyed to plate 13 by means of a stepped portion 49 extending into a corresponding stepped notch 51 provided in plate 13, adjacent the edge thereof. Likewise, screws 53 are provided for handle 33 and a stepped portion 55 on handle 33 extends into a stepped notch 57 in plate 15.

Spaced around the periphery of plate 13 are provided a plurality of substantially circular cut-out portions 59, 61, and 63. Cut-out portions 59, 61, and 63 are preferably of substantially the same size and each defines an area greater than half the area of a complete circle with the same radius to provide pairs of inwardly-hooked portions 65, 67 and 69 of plate 13 on either side of the cut-out portions 59, 61 and 63, respectively, the function of which will be more apparent in the description of the operation of the device to follow. The locations of cut-out portions 59, 61 and 63 are preferably such that cut-out portions 59 and 61 are positioned on either side of handle 31 adjacent the rearward part of plate 13 and cut-out portion 63 is disposed adjacent the forward part of the plate. Between cut-out portion 59 and cut-out portion 63 is provided a substantially V-shaped cut-out portion 71 in the plate 13. Similarly, a substantially V-shaped cut-out 73 is provided between cut-out portions 61 and 63. All of the cut-out portions 59, 61, 63, 71, and 73 are cut through the peripheral edge 75 of plate 13 so that entrance-ways are provided for the branches or the like to enter the cut-out portions.

Plate 15 is similarly provided with a plurality of cut-out portions in the plate around the periphery thereof. Thus, a pair of cut-out portions 77, 79 are provided in the rearward part of plate 15 on opposite sides of handle 33 and a pair of cut-out portions 81, 83 are provided in plate 15 adjacent the forward part and on either side thereof. Cut-out portions 77, 79, 81, and 83 are preferably of substantially the same size and shape as the circular cut-out portions in plate 13 and are located at substantially the same distance from the center of the plate 15, as those of plate 13. Thus, pairs of hooked portions 85 and 87 are provided in the plate 15 respectively adjacent cut-out portions 77 and 79. Also, hooked portions 89 and 91 are respectively provided in plate 15 adjacent cut-out portions 81 and 83. Plate 15 is pointed as at 93 adjacent the forward part thereof between cut-out portions 81, 83, so that when the pruner 11 is moved forwardly, the branches will be directed by point 93 into either cut-out portion 81 or 83.

It will be understood from the above description relative to the location and size of the cut-out portions that any one of the cut-out portions in one plate is adapted to be moved into alignment with any one of the cut-out portions in the other plate to define an aligned opening. Thus, a plurality of aligned openings are adapted to be successively formed by turning one of the plates 13, 15, relative to the other. One of such aligned openings 95 is shown in Fig. 2. It will be understood that only the circular cut-out portions are adapted to be substantially exactly aligned, and that the V-shaped cut-out portions 71, 73 are adapted to be substantially aligned with any of the circular cut-out portions in the opposite plate. Also, it should be pointed out that insofar as circumferential positioning is concerned the cut-out portions in plates 13 and 15 do not correspond. Thus, there is preferably an odd number of cut-out portions in plate 13 and an even number in plate 15 so that when any one of the openings in one of plates 13, 15 are aligned with any one of the openings in the other plate, the remainder of the openings will be in various positions of opening and closing.

Plates 13 and 15 are sharpened to provide sharpened edges 97, 99, 100, 101, 102, 103, 104, 105, and 107, respectively adjacent cut-out portions 59, 61, 63, 71, 73, 77, 79, 81, and 83, so that the sharpened edges of one of the plates 13, 15 cooperate with the sharpened edges of the other plate whereby pruner 11 is adapted to cut branches or the like that are in the openings when the plates are moved relative to one another.

Plate 13 is provided with sharpened teeth 109 adjacent the inner side of cut-out portion 59 to cooperate with similar sharpened teeth 111 on plate 15 adjacent the outer part of cut-out portion 79, for cutting larger limbs or the like. Similarly, plate 13 is provided with teeth 113 adjacent the inner part of cut-out portion 61 to cooperate with teeth 115, provided on plate 15 adjacent the outer part of cut-out portion 77.

In using pruner 11, handles 31 and 33 are grasped and the handles are swung back and forth and the plates 13, 15 moved against the shrub or the like to be cut. It will be understood that the handles are spaced apart vertically, as viewed in Fig. 1, so that they may be swung as far as the user desires past one another. For example, as shown in Fig. 3, handle 33 has been moved from the position shown in solid lines in this figure, towards handle 31, and thence past handle 31 to the broken line position. When at least a pair of the openings are in alignment for reception of a branch, then at least one other part of the pruner 11 is in a cutting disposition. Thus, as seen in Fig. 2, the aligned opening, as shown at 95, is in the position for reception of a branch and the teeth 113, 115 adjacent the partly closed opening as at 117 are in a cutting disposition. It should be noted in the above example that it is assumed that the handles 31, 33 are being moved in a direction away from one another.

From the foregoing, it will be understood that there is no lost motion in the pruner 11 of the present invention and that some of the openings are in a disposition to receive branches while other portions of the pruner are in cutting dispositions. In addition, it is apparent that cutting will take place, both on the forward and back strokes. Also, it will be understood that the hooked portions of the plates will prevent the branches from leaving the openings since the openings will be first closed adjacent the periphery plate and there is no way for the branches to slip out of the openings. It will be further understood that the pruner of the present invention may be moved in any direction for cutting and there is no need for the operator to pay particular attention to the positioning of the device relative to the branches since there is a plurality of openings for the branches to enter. Also, the device of the present invention will cut large limbs, as well as small branches or the like. It should be noted that the openings having the teeth 109, 111, 113 and 115 are particularly adapted for cutting large limbs by clamping the limb between the teeth and swinging the pruner 11, as a whole, back and forth to sever the limb. In addition, pruner 11 is adapted to be used as an edger for lawns or for cutting grass along the side of a wall or the like.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A pruner for cutting branches and the like comprising a substantially circular first plate, a substantially circular second plate of substantially the same diameter as said first plate and in substantially flat face-to-face sliding engagement therewith, means mounting said first and second plates for substantially free rotation relative to one another, said first plate being provided with a first pair of spaced and substantially circular cut-out portions adjacent the forward part thereof, said first plate having a forwardly directed pointed portion between said first pair of cut-out portions for guiding a branch into one of said cut-out openings, said first plate being provided with a second pair of spaced and substantially circular cut-out portions adjacent the rearward part thereof, said second plate being provided with a plurality of substantially circular cut-out portions, each of said cut-out portions in said first and second plates extending through the periphery of its related plate and defining an area greater than half of a circle to provide at least one hooked portion of the plate adjacent each of said circular cut-out portions, said first and second plates having cooperating sharpened edges adjacent said cut-out portions adapted for cutting branches and the like, a pair of elongated handles respectively fixedly attached to said first and second plates and respectively extending rearwardly therefrom whereby said handles are adapted to be swung to rotate said first and second plates, said first and second plates being relatively rotatable by said handles to carry any selected one of said cut-out portions in said first plate into a substantially aligned position with at least one of the cut-out portions in said second plate to form an aligned opening adapted to receive a branch, subsequent movement of said handles in either direction from a position in which said plates form said aligned opening being effective to carry the cooperating edges of said first and second plates adjacent said aligned opening into a selected one of a pair of cutting positions relative to the branch whereby said pruner is adapted to cut in both directions of movement of said handles, said cut-out portions of said first plate being so positioned relative to the cut-out portions in said second plate that when at least one of the cut-out portions in said first plate is in alignment with one of the cut-out portions in said second plate other portions of said first and second plates are in a cutting position, whereby said pruner is adapted to cut and at the same time receive branches for cutting.

2. The structure according to claim 1, including means for cutting large limbs comprising a first set of teeth on said first plate adjacent one of said cut-out portions and a second set of teeth on said second plate adjacent one of said cut-out portions, said first and second sets of teeth being movable into cooperating relationship for cutting a limb by swinging said pruner back and forth.

3. The structure according to claim 1, in which said mounting means comprises a bolt, one of said plates being provided with a tapped aperture, the other of said plates being provided with a smooth aperture, said bolt extending through said smooth aperture to provide an axle for said other of said plates, said bolt being threaded into said tapped aperture and means for locking said bolt relative to said one of said plates, whereby adjustment means is provided for compensating for wear of said plates.

4. A pruner for cutting branches and the like comprising a first plate, a second plate in substantially flat face-to-face sliding engagement with said first plate, means mounting said first and second plates for substantially free 360 degree rotation relative to one another, said first plate being provided with a plurality of substantially circular cut-out portions, said second plate being provided with a plurality of substantially circular cut-out portions, each of said cut-out portions in said first and second plates extending through the periphery of its related plate, said first and second plates having cooperating sharpened edges adjacent said cut-out portions adapted for cutting branches and the like, a pair of elongated handles respectively fixedly attached to said first and second plates and respectively extending rearwardly therefrom whereby said handles are adapted to be swung to rotate said first and second plates, said first and second plates being relatively movable by said handles to carry any selected one of said cut-out portions in said first plate into a substantially aligned position with at least one of the cut-out portions in said second plate to form an aligned opening adapted to receive a branch and thence to carry the cooperating edges of said first and second plates adjacent said aligned opening into a cutting position relative to the branch, said cut-out portions of said first plate being so positioned relative to the cut-out portions in said second plate that when at least one of the cut-out portions in said first plate is in alignment with one of the cut-out portions in said second plate other portions of said first and second plates are in a cutting position, whereby said pruner is adapted to cut and at the same time receive branches for cutting.

5. A pruner for cutting branches and the like comprising a first plate, a second plate in substantially flat face-to-face sliding engagement therewith, means mounting said first and second plates for substantially free rotation relative to one another, said first plate being provided with a plurality of cut-out portions, said second plate being provided with a plurality of cut-out portions, each of said cut-out portions in said first and second plates extending through the periphery of its related plate, said first and second plates having cooperating sharpened edges adjacent said cut-out portions adapted for cutting branches and the like, a pair of elongated handles respectively fixedly attached to said first and second plates and respectively extending rearwardly therefrom whereby said handles are adapted to be swung to rotate said first and second plates, said handles and said plates being unobstructed for substantially 360 degree rotation, said first and second plates being relatively rotatable by said handles to carry any selected one of said cut-out portions in said first plate into a substantially aligned position with at least one of the cut-out portions in said second plate to form an aligned opening adapted to receive a branch, said cut-out portions in said first plate being offset relative to the cut-out portions in said second plates whereby openings formed by the cut-out portions in said first and second plates are in various degrees of opening.

6. A pruner for cutting branches and the like comprising a first plate, a second plate in substantially flat face-to-face sliding engagement with said first plate, means mounting said first and second plates for substantially free 360 degree rotation relative to one another, said first plate being provided with a plurality of substantially circular cut-out portions, said second plate being provided with a plurality of substantially circular cut-out portions, each of said cut-out portions in said first and second plates extending through the periphery of its related plate, said first and second plates having cooperating sharpened edges adjacent said cut-out portions adapted for cutting branches and the like, a pair of elongated handles respectively fixedly attached to said first and second plates and respectively extending rearwardly therefrom whereby said handles are adapted to be swung to rotate said first and second plates, said first and second plates being relatively movable by said handles to carry any selected one of said cut-out portions in said first plate into a substantially aligned portion with at least one of the cut-out portions in said second plate to form an aligned opening adapted to receive a branch, subsequent movement of said handles in either direction from a position in which said plates form said aligned opening being effective to carry the cooperating edges of said first and second plates adjacent said aligned opening into a selected one of a pair of cutting positions relative to the branch whereby said pruner is adapted to cut in both directions of movement of said handles.

References Cited in the file of this patent

UNITED STATES PATENTS

| | | |
|---|---|---|
| 117,525 | Eggleston | Aug. 1, 1871 |
| 701,601 | McKinley | June 3, 1902 |
| 777,126 | McLeran | Dec. 13, 1904 |
| 1,767,077 | Johnson | June 24, 1930 |

FOREIGN PATENTS

| | | |
|---|---|---|
| 136,297 | Australia | Feb. 8, 1950 |